Oct. 30, 1951 C. L. GERLACH ET AL 2,573,169

BOTTLE LABEL REMOVER

Filed June 10, 1946 6 Sheets-Sheet 1

INVENTORS
CHARLES L. GERLACH
ROBERT W. MARTY
BY John W. Michael
ATTORNEY.

Oct. 30, 1951 C. L. GERLACH ET AL 2,573,169

BOTTLE LABEL REMOVER

Filed June 10, 1946 6 Sheets-Sheet 2

INVENTORS
CHARLES L. GERLACH
ROBERT W. MARTY
BY John W. Michael
ATTORNEY.

BOTTLE LABEL REMOVER

Filed June 10, 1946

INVENTORS
CHARLES L. GERLACH
ROBERT W. MARTY
BY John W. Michael
ATTORNEY.

INVENTORS
CHARLES L. GERLACH
ROBERT W. MARTY
BY John W. Michael
ATTORNEY.

BOTTLE LABEL REMOVER
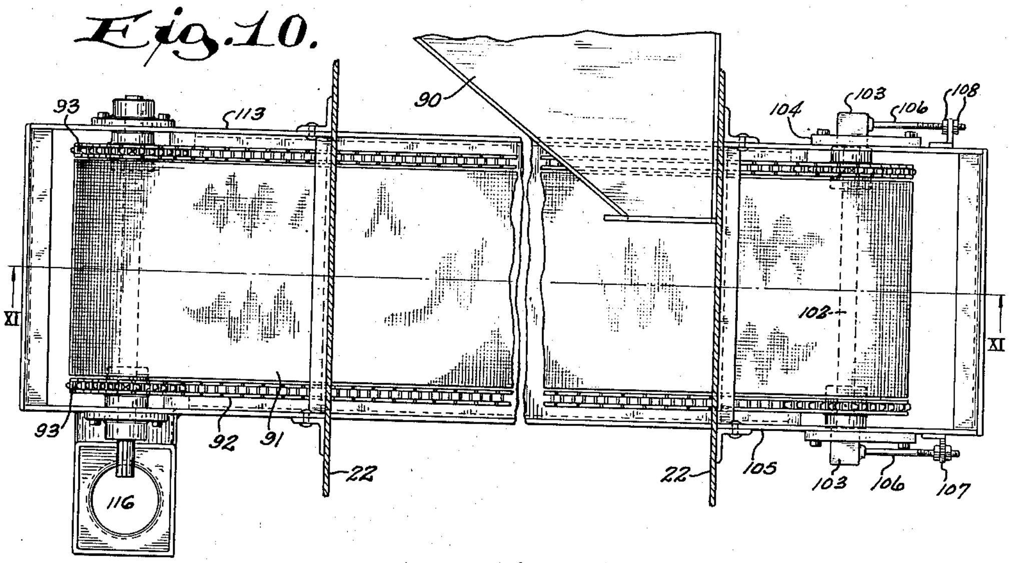
Fig. 10.
Fig. 11.
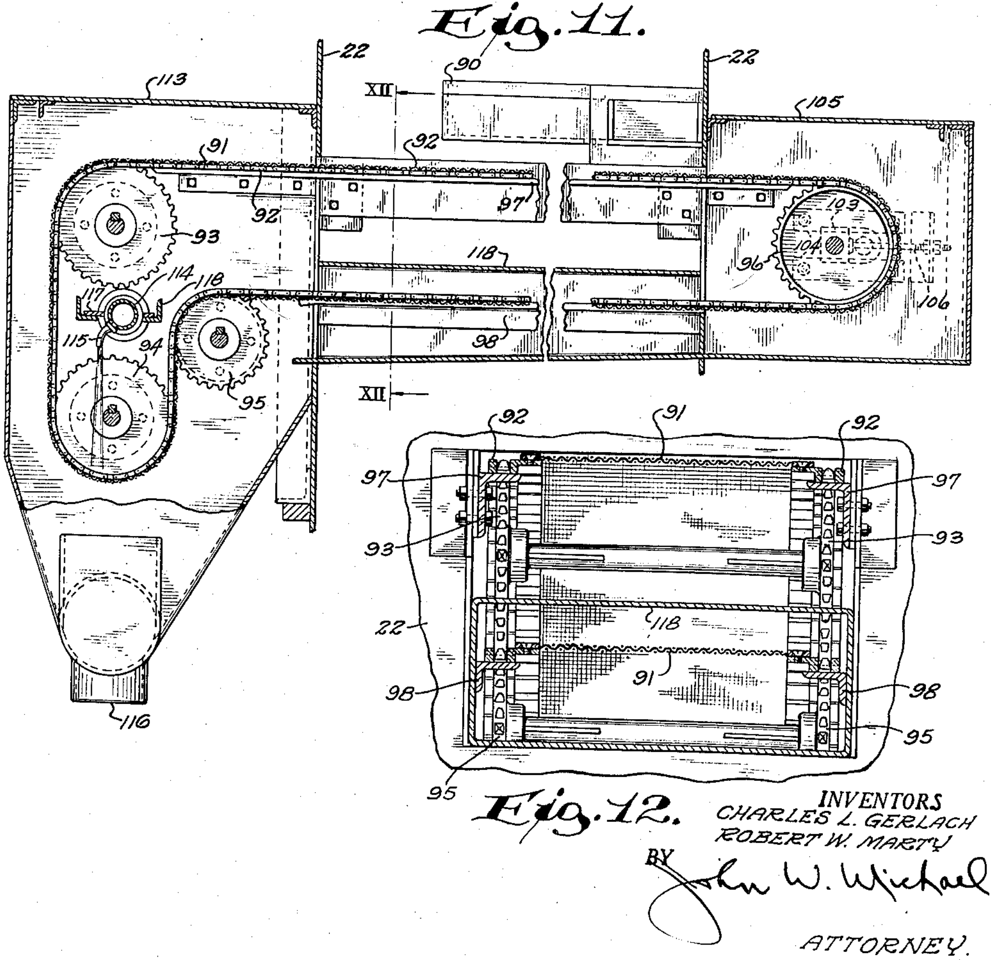
Fig. 11, Fig. 12.
INVENTORS
CHARLES L. GERLACH
ROBERT W. MARTY
BY John W. Michael
ATTORNEY.

Oct. 30, 1951 C. L. GERLACH ET AL 2,573,169

BOTTLE LABEL REMOVER

Filed June 10, 1946 6 Sheets-Sheet 6

INVENTORS
CHARLES L. GERLACH
ROBERT W. MARTY
BY John W. Michael
ATTORNEY.

Patented Oct. 30, 1951

2,573,169

UNITED STATES PATENT OFFICE 2,573,169

BOTTLE LABEL REMOVER

Charles L. Gerlach and Robert W. Marty, Waukesha, Wis., assignors to Michael Yundt Company, Waukesha, Wis., a corporation of Wisconsin Application June 10, 1946, Serial No. 675,572

6 Claims. (Cl. 134—104)

This invention relates to improvements in bottle-washing machines and particularly to a structure incorporated in such machines for insuring removal of the labels from the bottles during their passage through the machine.

It is one object of the present invention to provide a bottle-washing machine with means for removing labels from the bottles and for discharging the labels outside of the machine, thus improving both the actions of the bottle-scrubbing means and of solutions used in the machines in cleaning the bottles as well as lengthening the effective life of such solutions.

Another object of the invention is to provide means corelated with the conveyor transporting the bottles through the machine and on which the bottles are placed from but retained under the partial control of the conveyor and which shifts the bottles, relative to such conveyor, a number of times during each cycle of machine operations to provide access a number of times to the labels by the jets for washing the labels off the bottles.

A further object of the invention is to provide means for collecting the labels after their removal from the bottles and for simultaneously draining and carrying the labels outside of the bottle-washing machine proper where the labels are discharged to waste.

Another object of the invention is to provide means receiving the drained labels and preparing such labels for discharge as a viscous liquid which need only be diluted to obtain any desired fluidity.

And a further object of the invention is to so combine a label-removing mechanism with a bottle-washing machine as to minimize the additional space required for the entire combination and as to require only the minimum change in the general construction of the machine.

Objects and advantages other than those above set forth will be apparent from the following description when read in connection with the accompanying drawings, in which:

Fig. 10 is a top plan view of the means or sub-assembly for receiving and carrying, from the bottle-washing portion of the machine, the labels removed from the bottles;

Fig. 11 is a cross section on the plane of line XI—XI of Fig. 10;

Fig. 12 is a partial end view on the plane of line XII—XII of Fig. 11;

Figure 1:
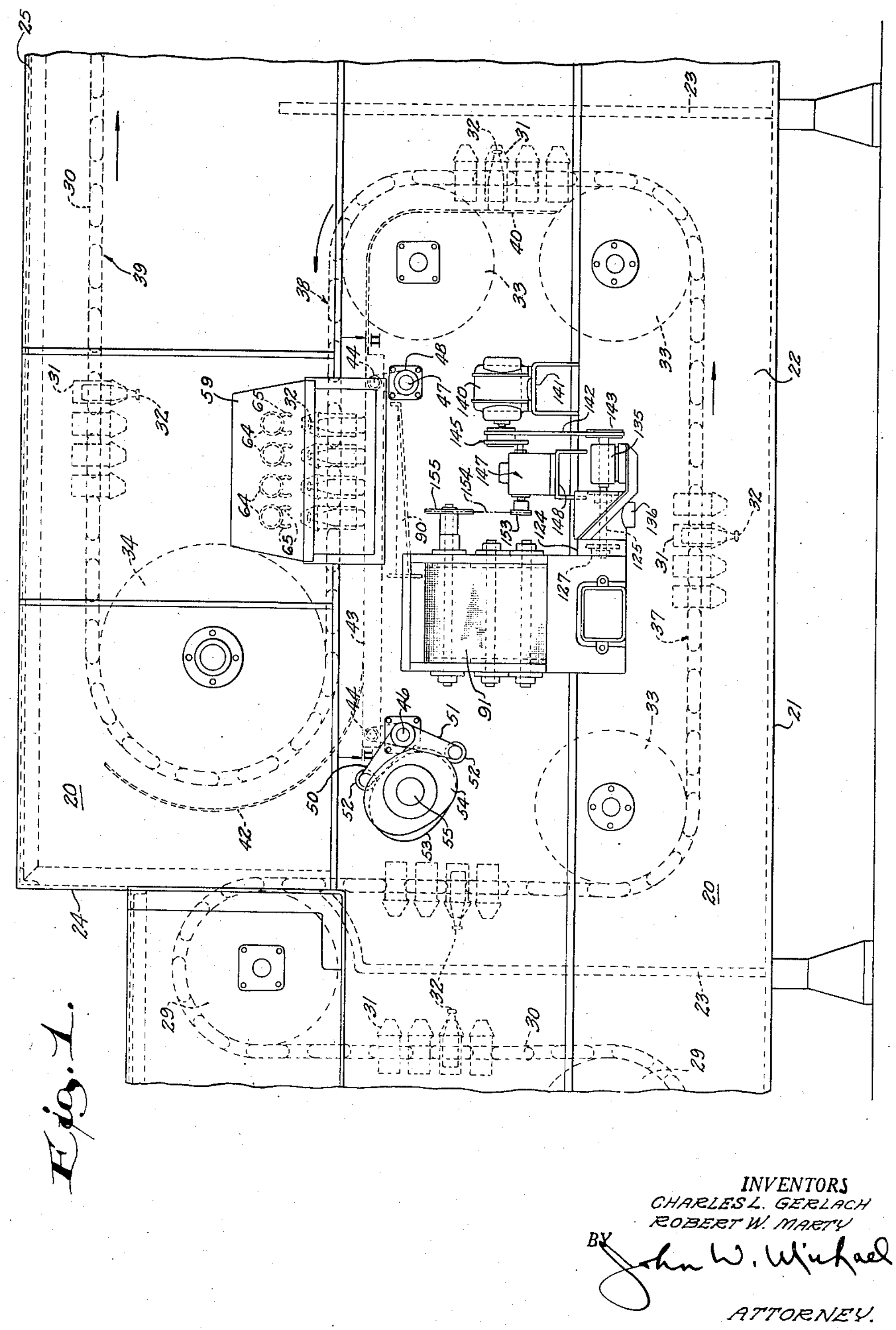
Fig. 1 is a partial side elevation of a bottle-washing machine somewhat diagrammatically showing the relations in a vertical plane of the various sub-assemblies of the present invention relative to each other and to the other portions of the machine.

Generally, the present invention is employed in combination with a bottle-washing machine of the type having a conveyor moving a number of rows of bottles through various compartments of the machine in which the steps of pre-heating, soaking, rinsing, jetting, and brushing are performed on the bottles. The present invention includes a plurality of means or sub-assemblies so combined with and related to the general structure of the bottle-washing machine and to each other as to insure removal of the labels from the bottles, to carry the labels outside of the field of the above-mentioned bottle-washing steps of the machine, and to prepare the labels for discharge to waste. Such sub-assemblies include means, in effect, receiving the bottles from the bottle conveyor and shifting the bottles a plurality of times relative to the bottle holders of the conveyor to place the bottles in positions for a label-removing operation to be performed thereon. Such label-removing operation involves applying a plurality of jets of high pressure liquid at a plurality of locatiosn to each of the bottles in each of several positions of the bottles and employs a sub-assembly especially designed to utilize high pressure and to be readily disassembled for cleaning, etc. Another sub-assembly receives the labels upon their removal from the bottles and carries the labels outside of the field of bottle-cleaning operations of the machine. Before the labels may be discharged to waste, the labels must be reduced by special means to a pulp or sludge which may be made sufficiently liquid to flow as desired. All of the above designated means are both structurally and functionally so combined and related to the machine generally as to coact therewith and avoid interference in the general operation of the machine and, of course, coact with each other in producing the final result of removing the labels from the bottles and disposing of the labels outside the machine proper.

Referring particularly to the drawings, the usual bottle-washing machine is modified by the addition of a special compartment, indicated at 20, which is interposed between two of the bottle-washing means stated above. The compartment is generally defined by a bottom 21, side walls 22, and partitions 23 forming a portion of the casing enclosing the bottle-washing mechanism generally. The side walls preferably extend above the other portions of the machine casing to inclose additional space between the special compartment end walls 24 and the top 25. The usual sprocket wheels 29 carry a chain conveyor 30 on which are mounted holders or pockets 31 in which bottles 32 are carried through the machine as is well known, said pockets being open at one end and constricted at the other end to hold bottles therein when said pockets are travelling with their open ends up. A plurality of sprockets 33 and 34 are so mounted in the compartment 20 as to provide for freeing the bottles temporarily in the pockets by reversing movement of the bottles relative to the general direction of bottle movement through the machine, thus minimizing the floor space required by the addition of compartment 20 and utilizing the height of such compartment most effectively for the structural relationships and the functional coaction of the various means of the present invention which cooperate in the label removing and disposing functions. Hence, the conveyor chain is provided with a reach 37 bringing the bottles to the position for the label-removing operation, an intermediate and reversely moving reach or zone 38 in which the label-removing operation is performed, and a top reach 39 delivering the bottle from the compartment 20. In the label-removing zone the pockets 31 have their open ends down and the bottles must be held within such pockets.

Figure 7:
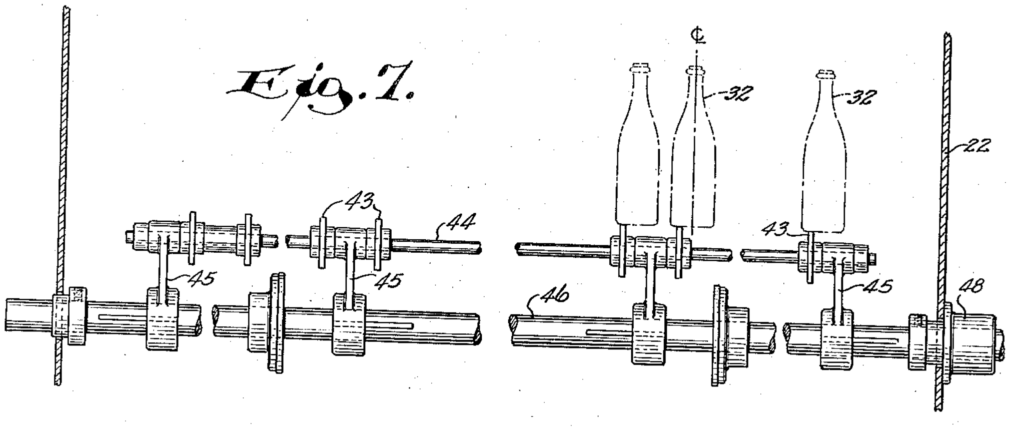
Fig. 7 is a partial end view of means or a sub-assembly on which the bottles are placed by the conveying bottle-holders or pockets but are retained under partial control of the holders and by which the bottles are shifted relative to such holders.
Figure 8:
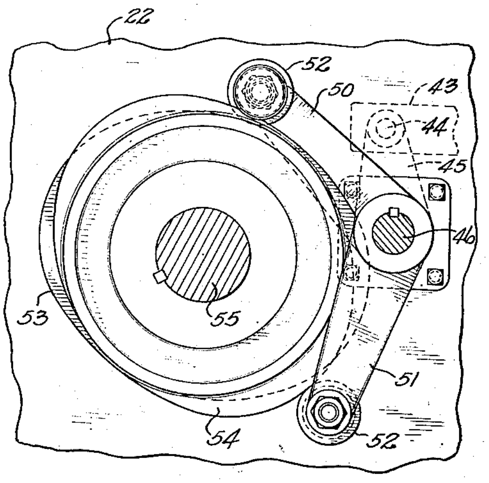
Fig. 8 is a side elevation of a portion of the mechanism for shifting the bottles relative to the holders.
Figure 9:
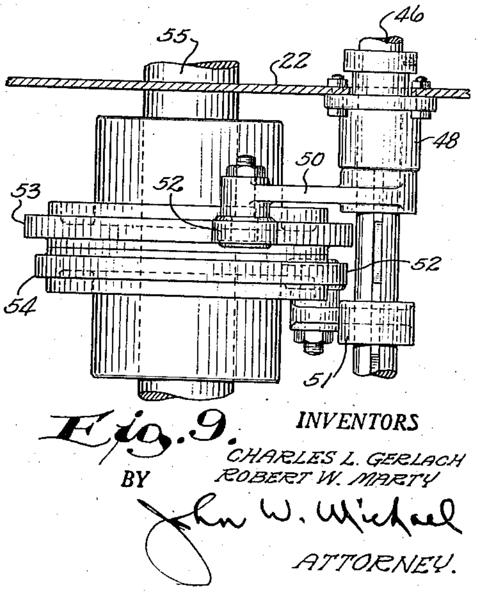
Fig. 9 is a top plan view of Fig. 8.

In the intermediate chain reach 38, where the position of the bottle pockets 31 is reversed from that of the preceding and succeeding reaches of the chain, the bottles 32 are freed from their seating in and control by the pockets to rest on the edges of bars 43, equal in number to the number of bottle rows in the machine. The bars 43 are located eccentrically (see Fig. 7) of the center line of the bottles as freed from the pockets and the bars are joined by rods 44 severally passing through the ends of the bars, the bars and rods forming a slotted table extending the width of the bottle conveyor 30—31 and for substantially the length of the conveyor reach 38 so that the bottles seat on the table at the beginning of such reach but remain within the confines of and are returned to the pockets at the end of such reach. Movement of the bottles out of pockets 31 to seat on the table is controlled by a guide 40 having bars 41 extending into interleaved relation with the table bars 43. A similar guide 42 is provided at the discharge end of the table to reseat and hold the bottles in the pockets until the bottles are in the top reach of the conveyor.

Figure 2:
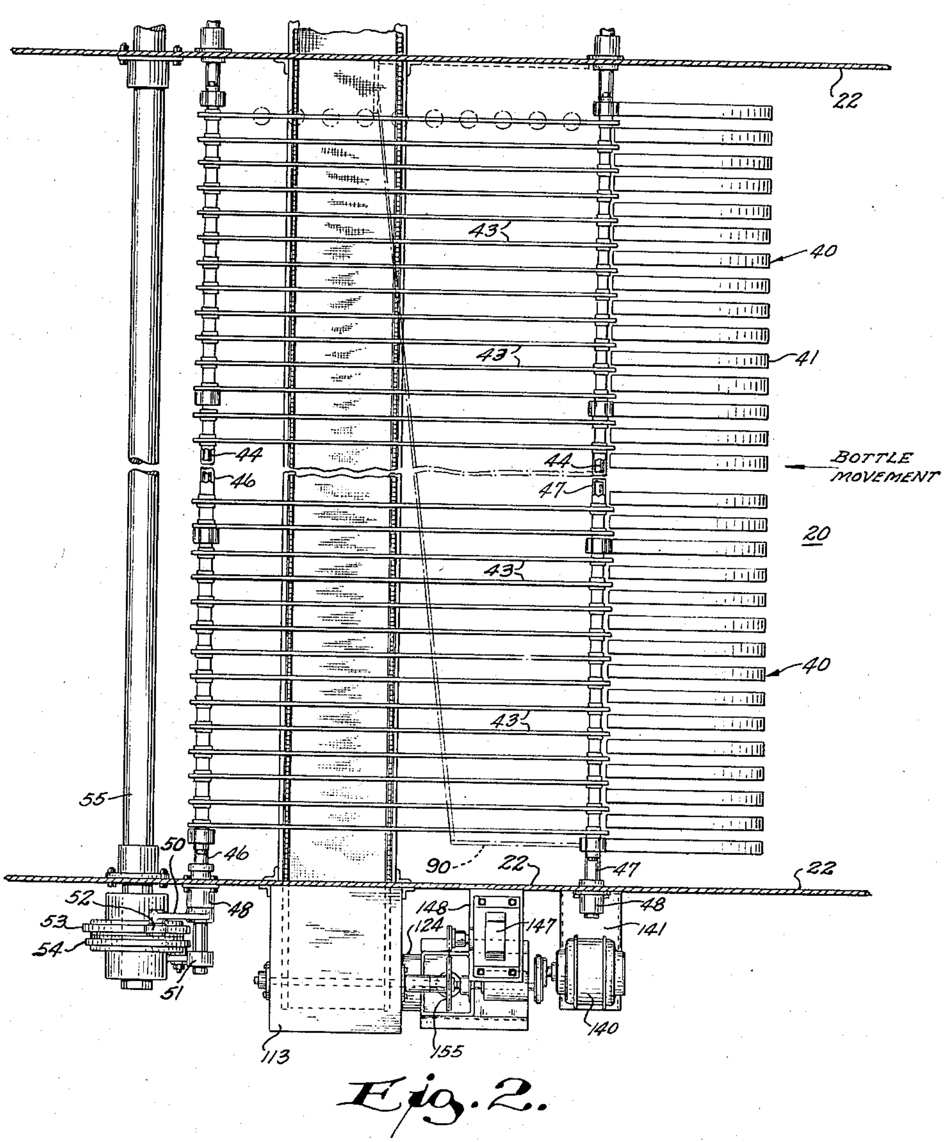
Fig. 2 is a cross sectional view on the plane of line II—II of Fig. 1 to show the relations of only the various sub-assemblies of the present invention to each other in a horizontal plane.

Referring now to Figs. 5, 7–9 in particular, the table is mounted on a plurality of rocker arms 45 movably engaging the rods 44 at each end of the table and fixed on rock shafts 46 and 47 extending across the machine and journaled in the side walls 22 thereof, as indicated at 48. The rock shaft 46 extends a sufficient distance outside one of the machine side walls 22 to have fixed thereon cranks 50 and 51 bearing rollers 52 to contact severally with the surface of cams 53 and 54 having a similar configuration but fixed in different positions on a counter shaft 55 extending across the machine and driven from the usual drive (not shown) for the conveyor 30—31. Hence, the table 43, 44 is reciprocated two strokes for each revolution of the shaft 55 which shaft is preferably so connected to the conveyor drive as to obtain one revolution of the shaft for each stepwise advance by the conveyor in its movement axially through the machine and corresponding to the axial distance occupied by four rows of bottles. As the pockets push the bottles along the bars 43 the bottles will be turned in one direction about their longitudinal axes. While this may be sufficient to free labels from between the bottles and the pockets, it has been found desirable to also temporarily reverse the direction of bottle turning. This is accomplished by reciprocation of the bars 43; the movement of such bars toward the left as viewed in Fig. 2 causes the rotation of the bottles to reverse.

Figure 3:
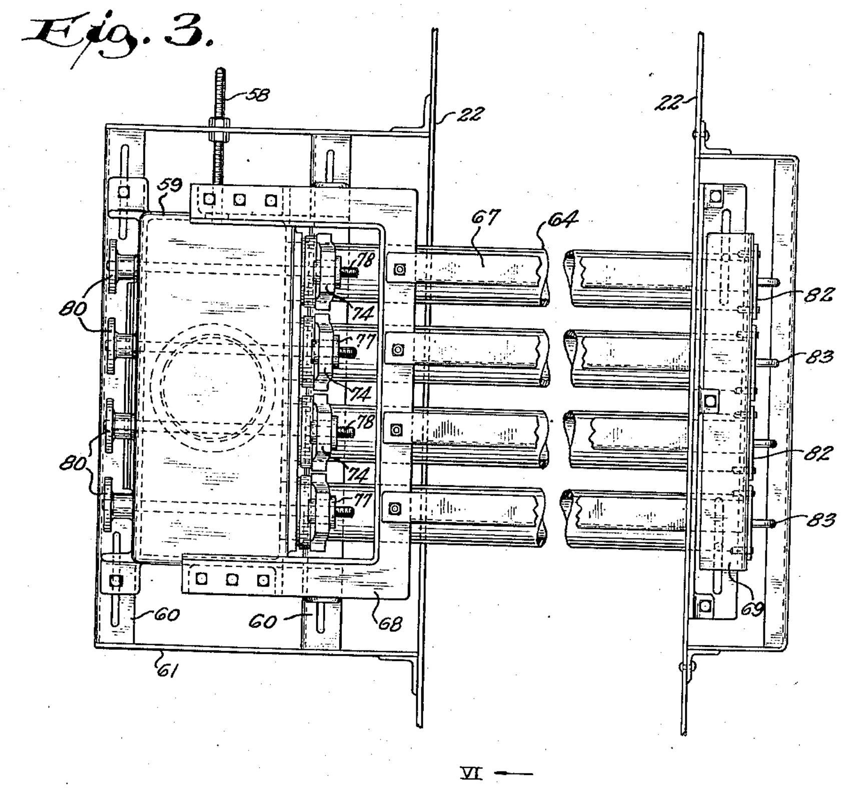
Fig. 3 is a top plan of the means or sub-assembly for applying pressure jets of liquid on several points of each bottle for removing the labels during passage of the bottle through the bottle-washing machine.
Figure 4:
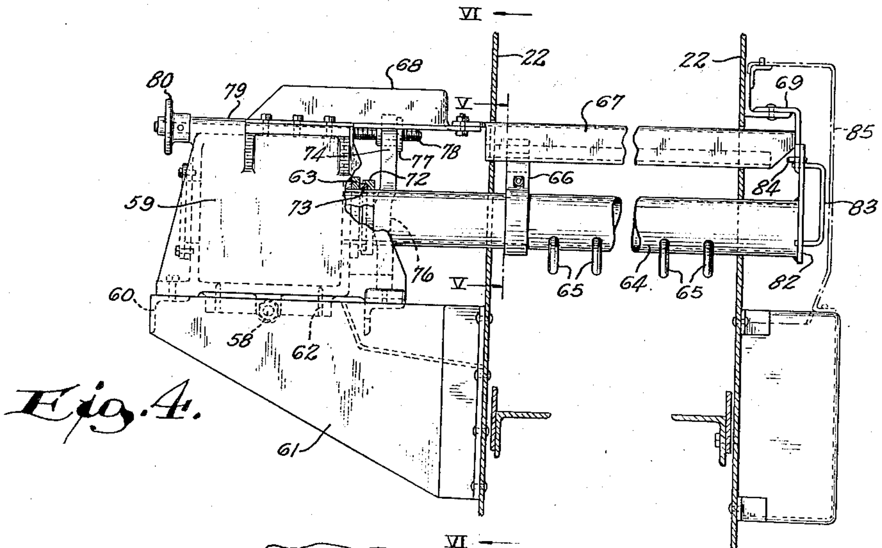
Fig. 4 is a side elevation of Fig. 3.
Figure 5:
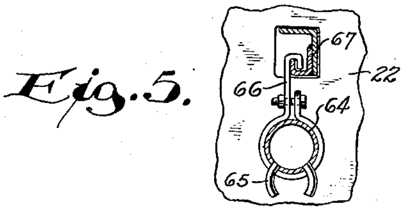
Fig. 5 is a cross section on the plane of line V—V of Fig. 4 of one of the jetting pipes and a portion of its support.

The pressure-jetting means or sub-assembly includes a manifold 59 preferably made as a single casting, adjustable by a screw 58 (see Figs. 3 and 4) on rails 60 on a bracket 61 extending from one side of the machine, and is supplied with liquid under pressure from a suitable source (not shown) by way of an opening 62 in the manifold. The manifold is provided with four apertures, with flanges 63, in one side of the manifold for receiving pipes 64 with nozzles 65, the pipes extending across the machine over and adjacent to the rows of bottles on the table and the nozzles being so positioned as to jet into the bottle pockets and on several portions of the several bottles resting on the table. The pipes 64 are suspended on hangers 66 (Figs. 4 and 5) sliding on substantially channel-shaped bars 67 extending across the machine between a bracket 68 fixed on the manifold and a bracket 69 fixed on one side of the machine.

Figure 6:
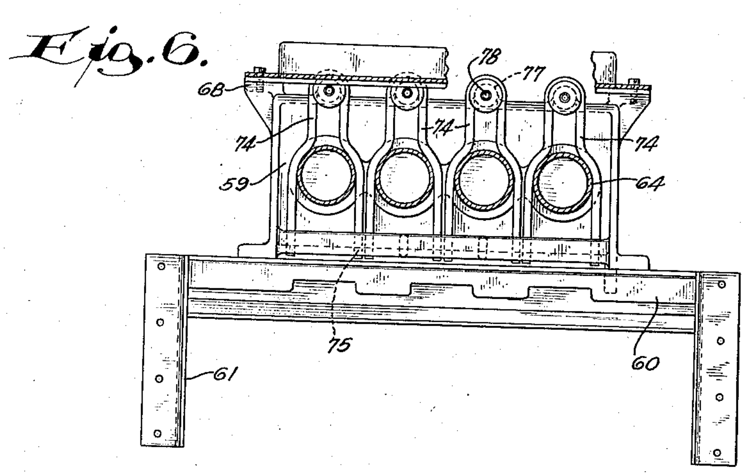
Fig. 6 is a cross section on the plane of line VI—VI of Fig. 4.

Each of the pipes 64 has a collar 72 formed thereon adjacent one end to receive a gasket 73 for seating on the flange 63 when the pipe end is inserted in a particular manifold aperture. The manner of making the joints between the pipes and the manifold need be described only in relation to one such joint. The seated gasket is pressed tightly on the flange, while retaining ready removability of the pipes, by the use of a bifurcated yoke 74 (Figs. 4 and 6) fulcrumed as at 75 in the casting 59 and having arcuate portions 76 severally bearing on the collar 72 at diametrically opposed points. The upper end of the yoke is provided with a nut 77 to receive a screw 78 mounted in a sleeve 79 on the manifold and the screw has a threaded handwheel 80 fixed thereon and bearing on one end of the sleeve. Rotation of the handwheel swings the yoke about its fulcrums and allows the making of a pressure-tight joint between the manifold and the pipe while retaining ready removability of the pipe for cleaning or other purposes. The other ends of the pipes 64 are severally closed by plates 82 with handles 83 by which the pipes and their hangers 66 may be pulled along the supports 67, and the plates are provided with pins 84 assisting in locating the pipes in a predetermined position when a pipe is to be replaced. A suitable cover 85 removably incloses the closed pipe ends projecting outside of the machine.

The labels are removed from the bottles by the force of the jets issuing from the nozzles 65 and are received on a chute 90 (Fig. 1) extending the full width of the machine under the table and shaped to discharge the labels adjacent a side wall of the machine, and over a relatively small area only, on a traveling screen sub-assembly by which the labels are drained and discharged outside of a side wall of the machine. A screen 91 (Figs. 10–12) of suitable mesh is mounted on sprocket chains 92 to form an endless belt. The chains engage with pairs of sprockets 93, 94, 95, and 96 of which the sprocket 93 is the screen-driving sprocket, sprockets 94, 95 serve only to change the direction of screen movement, and sprocket 96 is adjustably mounted to take up the screen slack. Between the sprockets 96—93 and 95—96 the chains and screen slide on ways 97, 98 extending across the machine. A shaft 102, to which the sprockets 96 are fixed, is journaled in cross-heads 103 slidable in guides 104 formed in the wall of a casing portion 105 extending from one side of the machine. The position of the crossheads in the guides is adjustable by screws 106 fixed in the cross-heads and extending severally through brackets 107 on the casing 105, the nuts 108 bearing on such brackets for adjustably positioning the cross-heads. Hence, the tautness of the chains and screen may be readily adjusted as desired.

It will be seen that the driving sprocket 93 and sprockets 94, 95 are mounted in a casing portion 113 also extending from the side of the machine. Sprockets 93 and 94 are spaced sufficiently for mounting therebetween a pipe 114 with a plurality of nozzles 115 directing jets of liquid under pressure on the reverse side of the screen for washing off the labels before the screen moves on its return reach between the sprockets 94—96. The labels washed off the screen fall into the hopper-like bottom of the casing extension 113 and discharge therefrom by way of an opening 116. It will be seen that the nozzle pipe 114, 115 is also removably mounted, as by lugs 117, fixed on the pipe and resting on angle brackets 118 extending across the casing extension 113.

Figure 13:
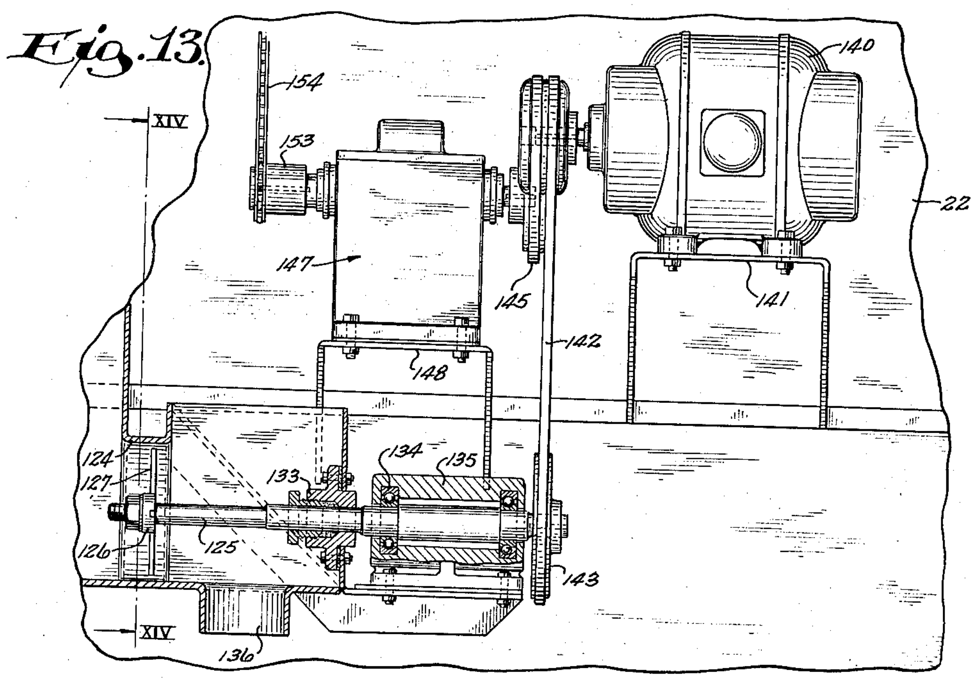
Fig. 13 is a side elevation of the means or sub-assembly for pulping the removed labels prior to discharge of the labels to waste and of the drive for the label-removing and label-pulping means.
Figure 14:
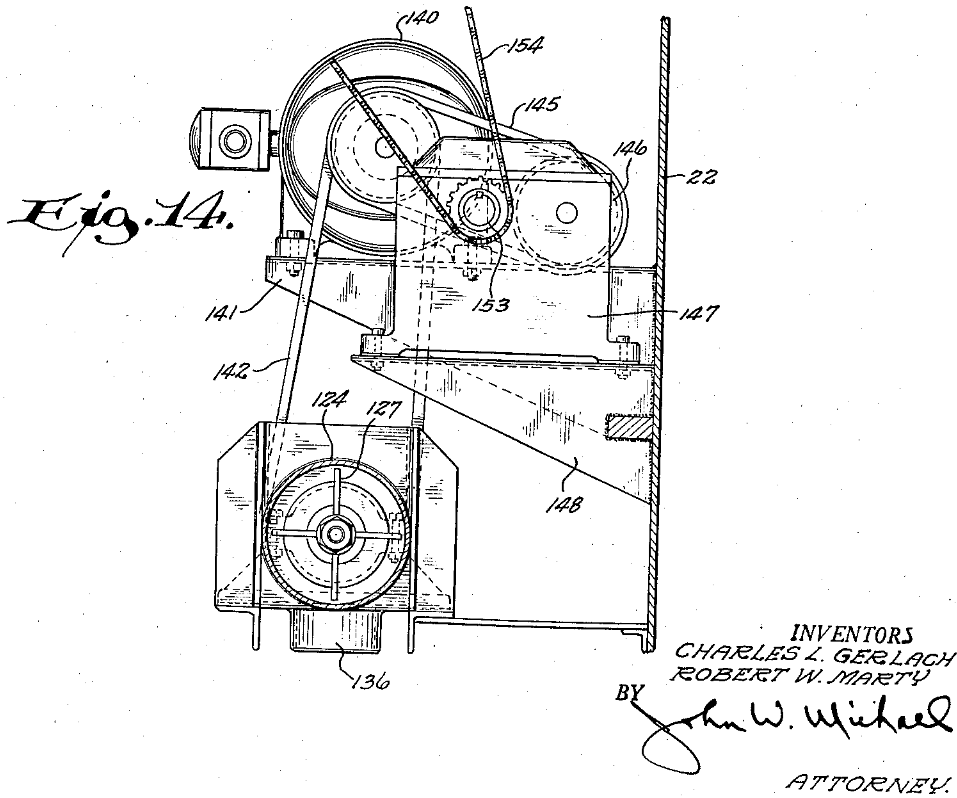
Fig. 14 is an end elevation of Fig. 13 on the plane of line XIV—XIV of Fig. 13.

As removed from the screen the labels are in relatively large pieces even though soaked, and it is accordingly desirable or may be required that the labels be reduced to a pulp or sludge which will flow readily in a drain with the minimum addition of water. The labels discharged through the casing opening 116 are directed toward and drawn through the casing 124 (Figs 13 and 14) in which the labels are beaten to pulp. The beater comprises a shaft 125 on which is mounted a hub 126 with beater arms 127 projecting therefrom. The shafts 125 extends from the casing 124 through a liquid-tight gland 133 and is journaled in suitable bearings 134 in a bearing pedestal 135. The pulped labels are discharged to waste from the beater casing by way of a drain 136.

Both the traveling screen and the beater are preferably driven by single means such as an electric motor 140 mounted on a bracket 141 outside the machine and adjacent the pulper. The motor pulley is belted, as at 142, to a pulley 143 on the end of the beater shaft 125 and is also belted, as at 145, to a pulley 146 on the input shaft of a speed reducer, generally designated 147, and mounted on a bracket 148 adjacent the motor. Such speed reducer may be of any well-known construction which, together with the speed reductions obtainable by way of the belt 145 and pulley 146, will give a speed on its output shaft suitable for driving the screen. The output shaft of the speed reducer has mounted thereon a sprocket 153 connected by a chain 154 with a sprocket 155 on the shaft bearing the chain driving sprockets 93.

It will thus be seen that the present invention provides means for freeing bottles in the conveyor pockets and shifting the bottles within the space defined by the bottle pockets and in timed relation to the conveyor movement. The shifting means act a number of times on each row of bottles during a given cycle of operations of the bottle-washing machine and the shifting means are driven by the same means as are used to drive the bottle conveyor. The bottles are spaced within and relative to the bottle pockets for the impingement thereon of a plurality of jets at varying angles to the center line of the bottles to flush off the already somewhat loosened labels. The label particles are collected by a traveling screen on the area of the screen commencing its travel through the machine so that the greater portion of the liquid drains from the label particles into the machine. The drained labels are carried out of the machine and are removed from the screen by jets applied to the reverse side of the reverse reach of the screen. The labels discharged from the screen are reduced to pulp before discharge to waste and both the screen and the pulper are driven by a single means separate from the conveyor and table drive and which drives the screen at a relatively low speed while driving the pulper at a relatively high speed.

Although but one embodiment of the present invention has been illustrated and described, it will be apparent to those skilled in the art that various changes and modifications may be made therein without departing from the spirit of the invention or from the scope of the appended claims.

We claim:

1. In a machine for washing bottles, a conveyor providing pockets receiving the bottles, a slotted table mounted adjacent to and receiving the bottles from the conveyor pockets, said table being spaced from said pockets only enough to let the bottles become partially free of said pockets while being moved along said table by said conveyor, means for moving the table back and forth to reciprocally turn the bottles about their longitudinal axes relative to the conveyor pockets while still in said pockets, and means for applying jets of liquid under pressure to the exterior of the bottles while being turned in said pockets to remove the labels therefrom.

2. In a bottle washing machine having a travelling conveyor provided with bottle pockets open at one end and constricted at the other end to hold bottles therein when said pockets are travelling with their open ends up, said machine having a label-removing zone through which said pockets travel with their open ends down, a bar for engaging the bottoms of bottles to loosely hold said bottles within said pockets as they move through said zone, said bar being eccentrically located of the center of bottles so held, whereby said bottles are rotated in said pockets as they are advanced thereby.

3. In a bottle washing machine having a travelling conveyor provided with bottle pockets open at one end and constricted at the other end to hold bottles therein when said pockets are travelling with their open ends up, said machine having a label-removing zone through which said pockets travel with their open ends down, a bar for engaging the bottoms of bottles to loosely hold said bottles within said pockets as they move through said zone, said bar being eccentrically located of the center of bottles so held, whereby said bottles are rotated in said pockets as they are advanced thereby, and means for longitudinally reciprocating said bar to cause the direction of said rotation to intermittently reverse and thereby aid the removal of labels and debris from between said bottles and said pockets.

4. In a bottle washing machine having a label-removing zone extending across said machine through which bottles travel longitudinally of said machine, a chute extending across said machine beneath said zone for receiving labels washed from bottles, said chute being inclined and having a discharge inside of and adjacent one side of said machine, and a travelling screen adjacent said chute and extending across the interior of said machine, said screen extending outside of said machine to discharge labels outside of said machine.

5. A bottle washing machine as claimed in claim 4 in which the top reach of said screen travels from the side of said machine adjacent said discharge to the opposite side whereby water pouring on said screen from said discharge drains into the bottom of said machine as said screen travels toward its label discharge end.

6. A bottle washing machine as claimed in claim 4 in which said screen at the label discharge end thereof is bent around an arc so that the outer surface thereof is facing downwardly, and in which there is a plurality of nozzles located within the confines of said screen and positioned to direct jets of liquid under pressure against the inner face of said screen as it is bent around said arc.

CHARLES L. GERLACH.
ROBERT W. MARTY.

REFERENCES CITED

The following references are of record in the file of this patent:

UNITED STATES PATENTS

| Number | Name | Date |
|---|---|---|
| 701,310 | Dietrich | June 3, 1902 |
| 1,423,342 | Loew et al. | July 18, 1922 |
| 1,780,772 | Washburne | Nov. 4, 1930 |
| 1,977,670 | Darling | Oct. 23, 1934 |
| 2,119,192 | Alexander | May 31, 1938 |
| 2,263,627 | Herold | Nov. 25, 1941 |
| 2,265,936 | Cowles | Dec. 9, 1941 |
| 2,314,048 | Ladewig | Mar. 16, 1943 |
| 2,318,524 | Read | May 4, 1943 |